UNITED STATES PATENT OFFICE.

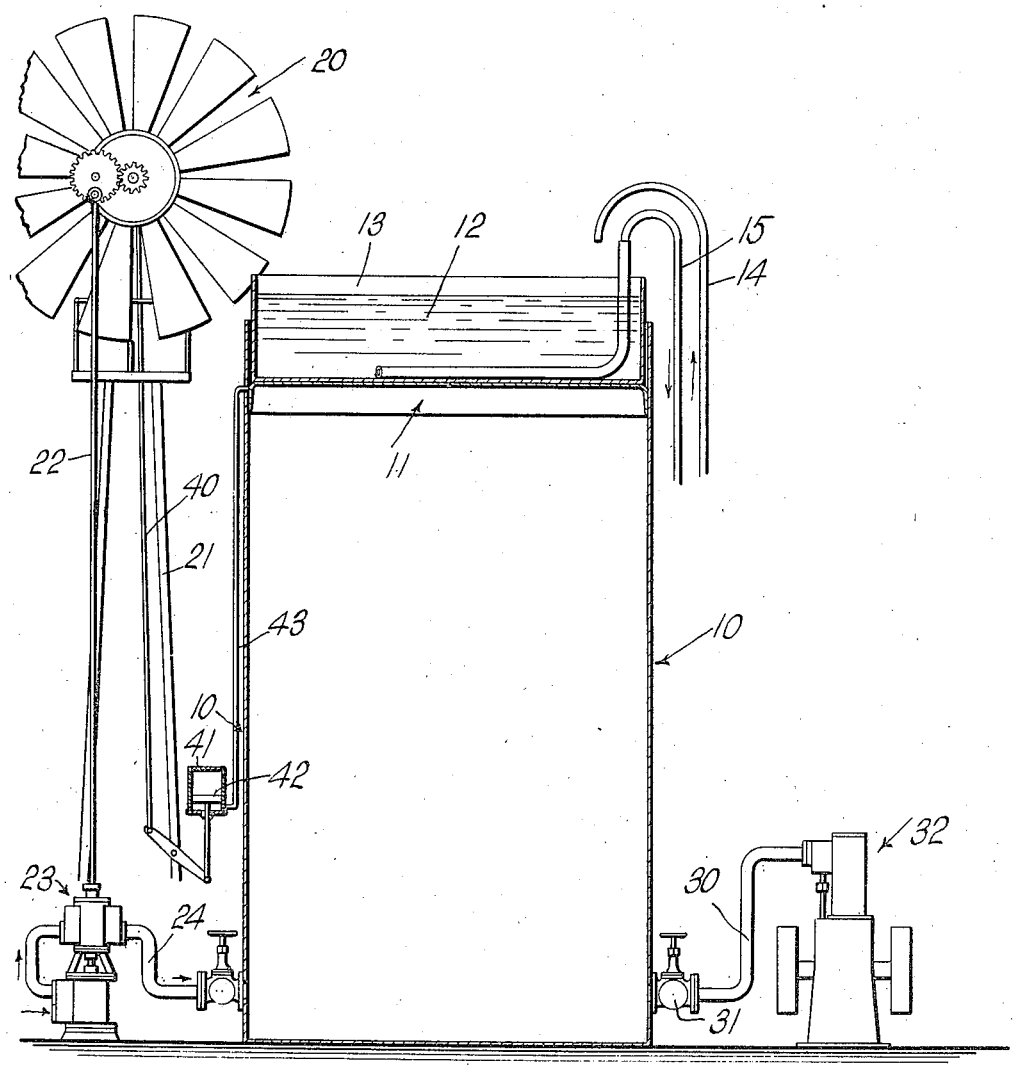

TOSHIHEI JIKIHARA, OF UPLAND, CALIFORNIA, ASSIGNOR OF ONE-HALF TO NASAJU ANDO, OF UPLAND, CALIFORNIA.

WIND-POWER.

1,211,161.        Specification of Letters Patent.       Patented Jan. 2, 1917.

Application filed July 6, 1915. Serial No. 38,045.

*To all whom it may concern:*

Be it known that I, TOSHIHEI JIKIHARA, a citizen of Japan, residing at Upland, in the the county of San Bernardino, State of California, have invented new and useful Improvements in Wind-Power, of which the following is a specification.

This invention relates to systems for the generation and storing and using of power; and particularly to a system for storing and using wind power; and the invention consists particularly in provision for obtaining wind power and transforming and utilizing it in such manner as to make the power uniform and continuous, so as to be available for various commercial purposes.

My invention is particularly useful in open and desert countries where wind prevails and where the pumping and storing of water is prohibitive.

I have illustrated a typical and preferred form of my invention in the accompanying drawings, in which I illustrate in diagram and section an embodiment of my invention.

In the drawings I illustrate a suitable air storage tank 10 of any desired capacity, which tank has a movable wall in the form of a piston 11, said piston being subjected to the pressure developed by the weight of a body of water 12 contained within a chamber or basin 13 mounted upon the piston 11. Pipes 14 and 15 provide means for introducing and withdrawing water so as to adjust and vary the amount of pressure exerted downwardly upon the piston 11, and so as to adjust and vary the pressure upon the air stored in the tank 10.

At 20 I have illustrated a typical form of wind mill mounted upon any suitable support 21; and said wind mill, in its operation, reciprocates a pump rod 22 which extends down and connects with the air pump 23 of any preferred design. This air pump 23 draws air from the atmosphere and pumps it through pipe 24 into the tank 10, where it is held under a uniform pressure due to the action of the piston 11. The pump 23 is designed for operation suitable to pump the air to the tank 10 against the pressure on the air in the tank. This pressure may be varied by varying the amount of water in the receptacle 13; so that the pressure against which the pump 23 works may be adjusted to suit the power of the wind mill. For instance, during seasons, or in places where the wind is comparatively light, the amount of water 12 may be reduced; while, when the wind is prevailingly heavy, the amount of water may be greatly increased to subject the air in tank 10 to a heavier pressure. Compressed air is led out through a suitable pipe 30 under control of a valve 31 to any suitable form of motor 32. This motor may be in the form of a compressed air engine, or the like, and may be used for operating any piece of machinery. For instance, the motor may be used for operating a dynamo for generation of electrical current. It will be seen that the power derived from motor 32 is uniform and may be continuous; due to the fact that there is a continuous uniform pressure upon the air stored in the tank 10. The power of the wind mill may be intermittent; and the various elements of the complete apparatus may be so designed that continuous uniform power may be derived from the motor 32; the pump 23 intermittently forcing air into the tank 10 and the motor 32 continuously using a uniform quantity of said stored compressed air.

As many wind mills as desired may pump air into one tank. When the tank becomes full, there are means provided for stopping the wind mill. On the ordinary mill there is usually a rod 40 downward movement of which will throw the wind mill edgewise to the wind. I provide a small cylinder 41 with piston 42 connected to the rod 40 in such manner that admission of air to the cylinder through pipe 43 will cause movement of the rod 40. The pipe 43 enters the tank 10 at a point which is uncovered by the piston 11 when the tank is full of air.

Having described a preferred form of my invention, I claim:

1. A power system of the character described, embodying in combination a wind power element, an air compressor operated thereby, a compressed air storage, and a compressed air motor operated by the stored compressed air, said compressed air storage embodying an upright tank with a piston movable from top to bottom of the tank, said piston fitting the tank to prevent escape of air, and means controlled by the piston when it reaches a position at the upper end of the tank to render the wind power element inoperative with reference to the air compressor.

2. A power system of the character described, embodying in combination a wind power element, an air compressor operated thereby, a compressed air storage, and a compressed air motor operated by the stored compressed air, said compressed air storage embodying an upright tank with a piston movable from top to bottom of the tank, said piston fitting the tank to prevent escape of air, means controlled by the piston when it reaches a position at the upper end of the tank to render the wind power element inoperative, and means for variably loading the piston embodying a weight chamber on the piston and means for introducing and withdrawing a fluid to and from the weight chamber.

3. A power system of the character described, embodying in combination a wind power element, an air compressor operated thereby, a compressed air storage, and a compressed air motor operated by the stored compressed air, said compressed air storage embodying an upright tank with a piston movable from top to bottom of the tank, said piston fitting the tank to prevent escape of air, means controlled by the piston when it reaches a position at the upper end of the tank to render the wind power element inoperative embodying an air pressure operated element and a pipe leading to said element and connecting into the upper part of the tank to be uncovered by the piston when the piston moves to its upper position, and means for variably loading the piston embodying a weight chamber on the piston and means for introducing and withdrawing a fluid to and from the weight chamber.

In witness that I claim the foregoing I have hereunto subscribed my name this 19th day of June 1915.

T. JIKIHARA.

Witnesses:
JAMES T. BARKELEW,
ELWOOD H. BARKELEW.